Figure 1:
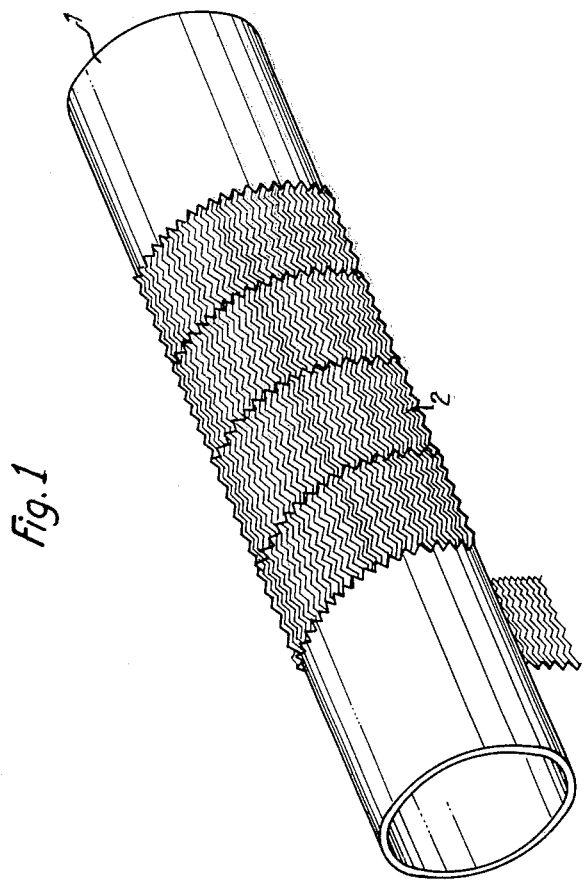

United States Patent Office 3,197,379
Patented July 27, 1965

3,197,379
GUIDE TUBES FOR NUCLEAR REACTORS
Lucien Alfille, Orsay, Jean Ropers, Vanves, and Claude Gewiss, Paris, France, assignors to Commissariat à l'Energie Atomique, Paris, France
Filed May 1, 1962, Ser. No. 205,813
Claims priority, application France, May 2, 1961, 860,477
6 Claims. (Cl. 176—43)
(Filed under Rule 47(a) and 35 U.S.C. 116)

The present invention relates to guide tubes for nuclear reactors. It is known that in various liquid-moderator fluid-cooled reactors, the fuel elements are arranged in channels or pressure tubes which completely pass through the moderator tank. The guide tube is the intermediate element arranged between the pressure tube and the fuel elements. One of its functions is to hold the pressure elements in a specified position within the pressure tube and to allow them to be displaced for loading or unloading. Finally, it enables a stream of cooling fluid to be formed when the fluid circulates in the pressure tubes.

The design of a liquid-moderator reactor cooled by a circulating fluid may take many forms. For example, it is possible to provide a pressure tube which may or may not be in contact with the moderator along its outer face and with the cooling fluid along its inner face. In this arrangement, the pressure tube may be either relatively hot, if no heat insulation is interposed between its inner surface and the fuel elements, or at a temperature approximating to that of the moderator in the opposite case wherein the heat insulation is adequate.

The invention relates more particularly to a guide tube which may be used in reactors, the pressure tubes of which are surrounded by a cold moderator and are in contact with the cooling fluid and heat-insulated from the fuel elements. It is obvious that the heat insulation used should absorb as few neutrons as possible, it must, moreover, resist corrosion by the cooling fluid at the operational temperature.

It has already been proposed to arrange a stream of gas between the pressure tube and to the tube conducting the cooling fluid within the pressure tube, and this is effected by means of a filler material which is a poor conductor of heat. If a filler material having a very low mechanical resistance to crushing is used, it is necessary to provide a centering device for the guide tube within the pressure tube.

Several ways are already known for constructing such a centering device, for example by means of silicon or magnesium supports interposed between the guide tube and the pressure tube. In fact, when employing such a centering device, serious difficulties result from the heat respiration of the hot guide tube in the cold pressure tube and from the longitudinal stresses to which this guide tube is submitted when the fuel elements are loaded and unloaded.

It has also been suggested to use, as a filler material, a material able to support the inner tube arranged in the guide tube. Vitreous silica or sheets of oxidised aluminium helically wound around the guide tube constitute filler materials having advantageous mechanical, thermal and neutron properties.

The invention has for an object to simplify the construction and use of composite guide tubes that comprise an inner tube supported along its entire length by a heat insulating coating.

According to the invention, a composite guide tube for a pressure element housed in a pressure tube of a fluid-cooled nuclear reactor, comprises an inner metal tubular element for guiding the fuel element, at least one metallic structure having a low apparent density and at least partially surrounding said tubular element, the inner surface of said structure being applied to the tubular element and the outer surface thereof abutting the inner face of the pressure tube, means for holding said structure on the tubular element, and means secured to said tubular element for maintaining the latter in position in the pressure tube in which it is housed.

Figure 2:
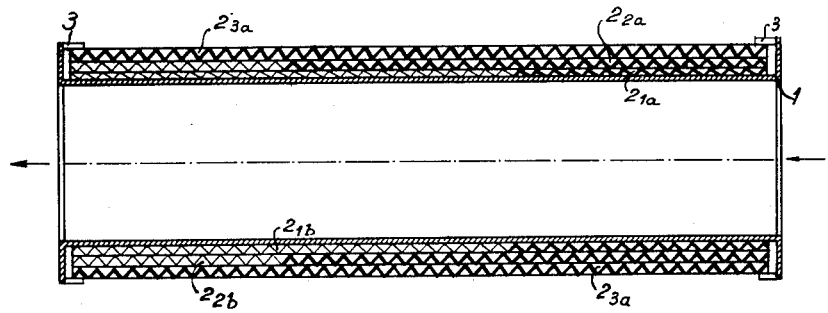
Figure 3:
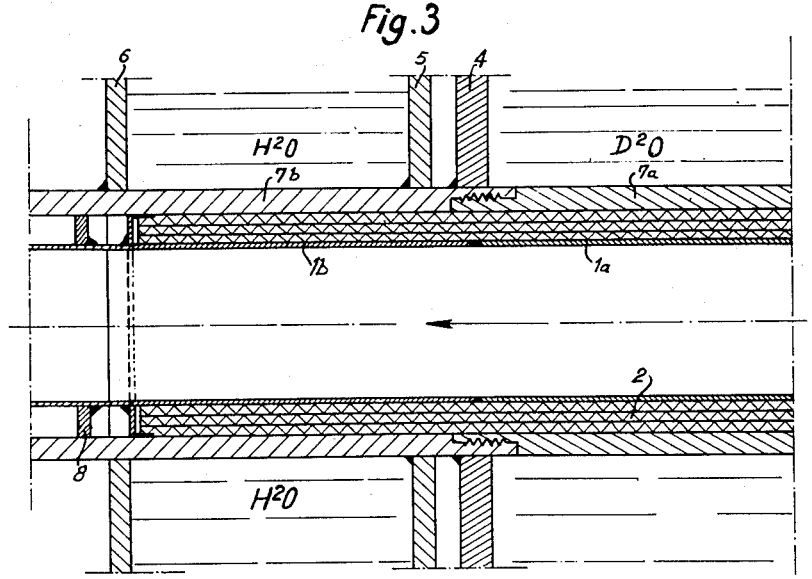

In order that the invention may be more clearly understood, reference will now be made to the accompanying drawings which show one embodiment thereof by way of example and in which:

FIGURE 1 shows a diagrammatic perspective view of the arrangement of the metallic structures on the inner tubular element of a composite guide tube according to the invention, FIGURE 2 shows a section of the superimposition of the structural layers in a composite tube in accordance with the invention, and FIGURE 3 shows a section of the end of a composite tube in accordance with the invention, arranged in a pressure tube of a nuclear reactor.

In nuclear reactors it is frequently necessary to heat-insulate two liquids. In liquid-moderated reactors (heavy water moderator for example), it is particularly advantageous to heat insulate the moderator of the heat carrying liquid circulating in the pressure tubes and intended for cooling the fuel elements.

The pressure tubes resist the nuclear mechanical stresses all the better if their temperature is approximately that of the ambient temperature. When using heavy water, it is known that the moderating qualities of this liquid decrease as its temperature increases. In order to reduce the quality of heavy water stationary principally in the heat exchangers, it is therefore advantageous to avoid any excessive heating thereof. These considerations, among others, make it preferable to heat-insulate the pressure tubes and the heat carrier liquid of the gas stream in contact with the fuel elements.

Mechanical conditions make it necessary to construct a guide assembly which is relatively rigid under operational conditions. This rigidity may be obtained either by the guide tube itself, or by combining the latter with the heat insulator surrounding it. If a material is used which has very good mechanical characteristics under operational conditions, the thickness of the guide tube may be reduced. This reduction corresponds to a neutron gain which influences the diameter of the fuel tube, the security and yield of the reactor. According to the invention, the use of a metal insulator having, at a low density, a relatively large moment of inertia, enables the thickness of the central tubular element of the composite guide tube to be considerably reduced, the metal reinforcement of this element being obtained by the joint means between the tubular element and its heat insulator.

It is, however, necessary when reducing the thickness of the inner tubular element to take into account the longitudinal mechanical stresses occurring when loading and unloading the fuel elements.

In the composite guide tube according to the invention, the main tubular element is supported along its entire length or a major part thereof by the heat insulator secured to its outer surface. This is one element in favour of reducing the thickness of the inner tubular element. Moreover, the resistance to crushing which is required of this insulator per unit of surface area is less than that which would be required of discontinuous supports. Structures constituted by thin sheets of suitably permanently bent or otherwise deformed metal have both a satisfactory resistance to crushing for the use envisaged and sufficiently break down the gas stream in which they are located, in order to constitute an efficient heat insulator.

The heat insulation is improved because the imprisoned gas stream is divided up into a large number of independent pockets by the bends of the metal sheet. The metal conduction in the sheets used should, nevertheless, be taken into account which is why it is preferable to use thin sheets.

It should be noted that the use of thin sheets signifies a low apparent density, that is to say the specific mass of the structure which is an important factor for use in a nuclear reactor. In fact, a low loss of neutrons for the insulator assembly results from this low apparent density despite the fact that the neutron-absorption cross section of the alloy used (stainless steel, for example), is relatively high.

It is suitable to recall that by apparent density (or specific mass) is meant the quotient of the mass of a body divided by its volume, the latter being, in the case of the structure, defined by the envelope surfaces of the said structure.

An advantageous compromise between the thinness of the sheet, the heat insulation, the resistance to crushing and the neutron properties sought is obtained by means of structures bent into a chevron shape so as to constitute an expansible surface, the upper and lower edges of the bends or folds being located in two parallel planes.

Use of this type of structure does not, however, constitute a limitation of the invention and all metal structures having both a low absolute density, a high resistance to crushing, a coefficient of thermal conduction with small thickness and effecting an adequate subdivision of the imprisoned gas stream are suitable for constructing a composite guide tube according to the invention, as long as the structures chosen are sufficiently deformable that they may be helically wound around the inner tubular element.

Referring now to the drawings, FIGURE 1 shows the manner in which a composite guide tube according to the invention is constructed. In this drawing, reference numeral 1 designates the inner tubular element, the central part of which at least is constituted by material having a small effective neutron-absorption cross-section, of calcined magnesium for example. Prefabricated strips 2 are helically wound around this tubular element, these strips being of a metal structure bent into a chevron or similar patterns and made from thin sheets of a suitable alloy from the point of view of neutron, thermal and mechanical characteristics. The width of the strips is chosen as a function of the diameter of the tubular element 1. This width decreases as the diameter of the tubular element 1 becomes smaller. This precaution is necessary in order to avoid too large a deformation of the structure when applying it to the tubular element. It is not, in fact, always possible to obtain structures which are geometrically applicable to a cylinder of any given diameter.

The helical pitch of the winding may be chosen to approximate the width of the strip being wound, so that almost the entire outer surface of the portion of the inner tubular element to be insulated is covered.

A first strip layer is wound around the inner tubular element and a second layer, formed by a strip wound in the opposite direction to the first, is then positioned. The process is then continued in the same manner until the desired heat insulation and outer diameter are obtained. In a first embodiment the strips are held at the two extremities of the composite tube by means of collars.

As already indicated in the choice of materials used to constitute the strips 2, it is necessary to take into account the temperature to which the strips will be taken during operation of the reactor. This temperature depends upon the geometric position of the strips along the fuel tube and its distance in relation to the inner tubular element 1. In the hot zone it is preferable to use, in order to avoid corrosion by the heat carrying fluid, materials such as stainless steel, and in the relatively cold zones it is preferable to use less absorbent materials such as zirconium or alloys thereof.

In a second embodiment, particularly where it is desired to increase the rigidity of the guide assembly, especially if the inner tubular element is relatively thin, it is advantageous to fasten the first strip onto the inner tubular element at various points and also to fasten the strips to one another. This may be effected by spot or roller welding. If it is not possible to weld to the inner tubular element, it is advantageous to extend the ends by adding tubular parts made from a material capable of being welded to the strip used for the first layer at least; in this respect it should be noted that the small thickness of the inner tubular element may make it preferable to manufacture it from an easily weldable material but having poor neutron properties. In order to increase the resistance to flexing of the assembly it is also advantageous to weld the superposed strips, and, if necessary, the adjacent edges of the strip constituting each layer.

FIGURE 2 diagrammatically shows an embodiment wherein the different thermal properties of the strips 2 have been put to advantage in order to reduce the total neutron absorption resulting from their use.

In this figure, it has been assumed that the heat carrier liquid enters at the right end of the inner tubular element 1 in order to leave from the left end thereof. Under these conditions, the heat carrier liquid is relatively cold in the right portion of the tubular element, it becomes progressively hotter towards the left and is hottest at the left portion. The entire right end of the inner tubular element 1 may advantageously be provided with a first layer $2_{1a}$ of zirconium or a zirconium alloy such as that known under the registered trademark "Zircalloy," whereas the left end should be provided with a first layer $2_{1b}$ of stainless steel. The position of the junction between the zirconium strip and the stainless steel strip is selected so that the zirconium has satisfactory behaviour (for example to corrosion), at the temperature of the corresponding region of the inner tubular element. This junction itself may easily be made by overlapping the two adjacent strips one on the other. The second layer is constituted in the same manner as the first but the junction between the zirconium strip $2_{2a}$ and the stainless steel strip $2_{2b}$ is located closer to the hot end of the tubular element 1 in this second layer.

In the chosen example it has been supposed that the temperature of the outer surface of the second layer corresponds to good behaviour of the zirconium, it is then possible to make the third layer entirely of zirconium. This eliminates discontinuity on the outer surface of the composite guide tube, which is manifested by a joint between strips of different materials. In order to hold the assembly of superposed strips, it is sufficient to secure the last applied strip at its two ends, for example by means of metal clamping collars 3, or to surround the whole by a smooth helically-wound zirconium ribbon, with or without overlapping the convolutions.

FIGURE 3 shows the end of a horizontal composite guide tube adjacent the outlet from the moderator which here is assumed to be heavy water.

The heavy water is contained in a steel tank 4, and a second tank 5 generally separates the heavy water from the light water. Light water, used as a screen, is located between tanks 5 and 6. Reference numeral $7_a$ designates the central part of the pressure tube; this may, for example, be constituted by a zirconium alloy: such as that known as "Zircalloy 2," a part $7_b$ made from stainless steel, projects beyond the moderator tank and is welded to the tanks 4, 5 and 6. The prefabricated composite guide tube is introduced into the horizontal pressure tube; the latter comprises a tubular element $1_a$ which is advantageously constituted, as previously mentioned, of calcinated magnesium for example. At the end of the tubular element $1_a$ it is useful to add a stainless steel member to abut a stop 8 secured to the pressure tube: the composite guide tube is fixed to this stop 8. The end of the pressure tube shown in FIGURE 3 is that by which the fuel elements are discharged. This is effected by causing the fuel elements to move from the right to the left which results in a thrust force by the composite guide tube on its stop. The other end of the composite guide tube, not illustrated, is free in the pressure tube; it also advantageously comprises an end portion of stainless steel. This end being free, no additional stress is caused as a result of the differential expansion of the pressure tube, which is kept cold, and the inner tubular element 1.

It will be noted that the insulating metal strips are entirely surrounded by the heat carrier fluid used, and it is therefore desirable that they should be resistant to corrosion.

It will be apparent that the invention has been described only by way of example and that various modifications may be made to the specific details hereinabove set forth without in any way departing from the scope thereof.

We claim:

1. In a fluid cooled liquid moderated nuclear reactor, at least one horizontal pressure tube passing through the reactor and a composite guide tube for a fuel element housed in said pressure tube comprising an inner metallic tubular element for guiding the fuel element, at least one metallic structure having a low apparent density surrounding said tubular element, the inner surface of said structure contacting said tubular element and the outer surface of structure contacting the inner surface of said pressure tube, means for holding said structure on said tubular element and stop means secured to said tubular element and to said pressure tube for maintaining said tubular element in position in the pressure tube, said metallic structure comprising helically wound strips forming at least one layer on said tubular element, each of said layers covering the surface on which it is wound, said strips located in the hot inner zone of the reactor being of a different material from those located in the cold outer zone of the reactor.

2. A reactor as described in claim 1, wherein at least the ends of said inner tubular element are steel.

3. A reactor as described in claim 1, wherein means for connecting said inner tubular element to the pressure tube are arranged close to that end of the pressure tube from which the fuel element is discharged.

4. A reactor as described in claim 1, wherein the strips located in the hot inner zones of the reactor are of stainless steel, and the strips located in the cold outer zones are of zirconium base material.

5. A reactor as described in claim 1 said structures comprising a plurality of layers of strips each of said layers including a steel structure and a zirconium structure arranged successively, the surface covered in each of said layers by said steel structure decreasing from layer to layer towards the periphery of the guide tube, the peripheral one of said structures being a zirconium structure.

6. A reactor as described in claim 1, wherein said structures are welded together and are welded to said inner tubular element.

References Cited by the Examiner

UNITED STATES PATENTS

| | | | |
|---|---|---|---|
| 230,033 | 7/80 | Merriam | 138—148 |
| 1,411,960 | 4/22 | Doino | 138—148 |
| 1,612,092 | 12/26 | Blackburn. | |
| 1,677,714 | 7/28 | Frease | 138—148 X |
| 2,136,086 | 11/38 | Rosenblad. | |
| 2,773,459 | 12/56 | Sechy | 204—193.36 X |
| 3,085,961 | 4/63 | Charlesworth | 176—43 |
| 3,090,743 | 5/63 | Alfille | 204—193.2 |

FOREIGN PATENTS

| | | |
|---|---|---|
| 1,223,077 | 1/60 | France. |
| 1,233,569 | 5/60 | France. |

REUBEN EPSTEIN, *Primary Examiner.*

CARL D. QUARFORTH, *Examiner.*